Figure 6:
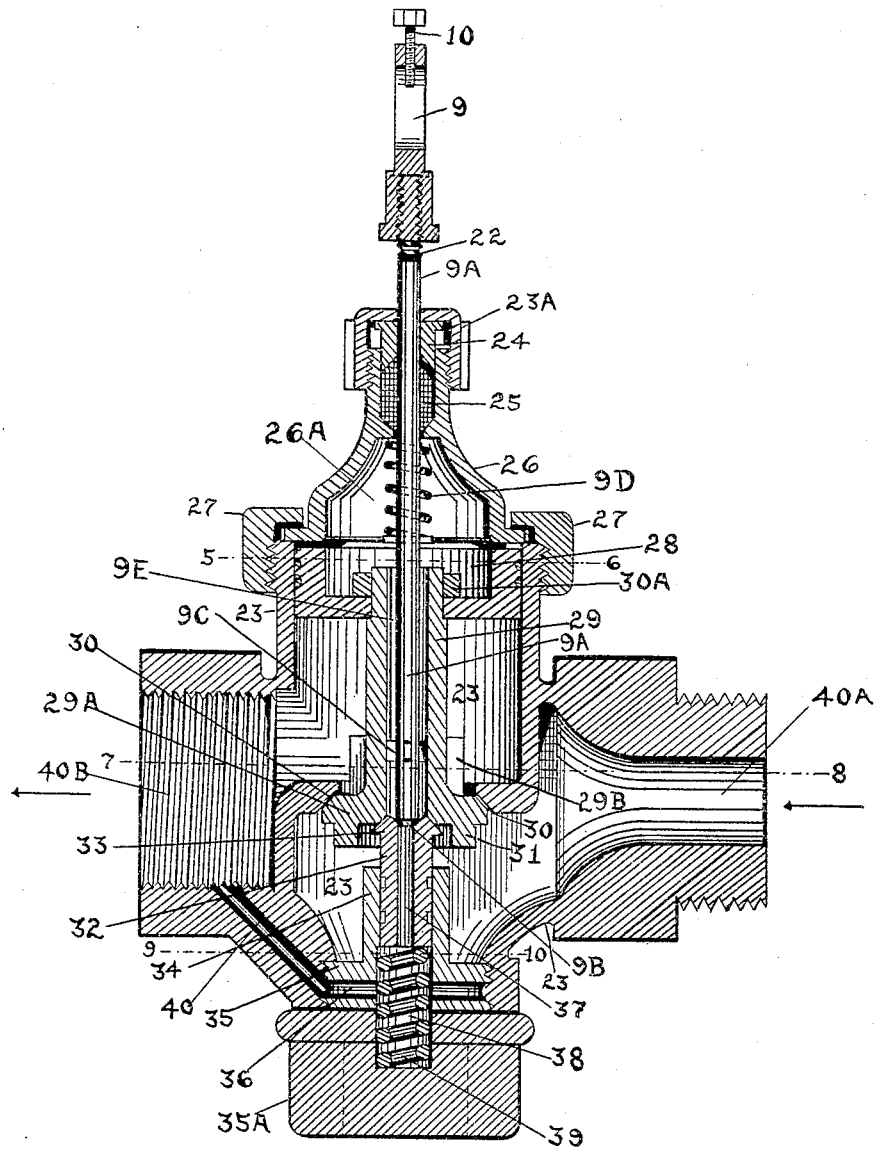

No. 778,754. PATENTED DEC. 27, 1904.
J. W. LYTTON.
STEAM TRAP.
APPLICATION FILED JULY 29, 1904.
4 SHEETS—SHEET 1.
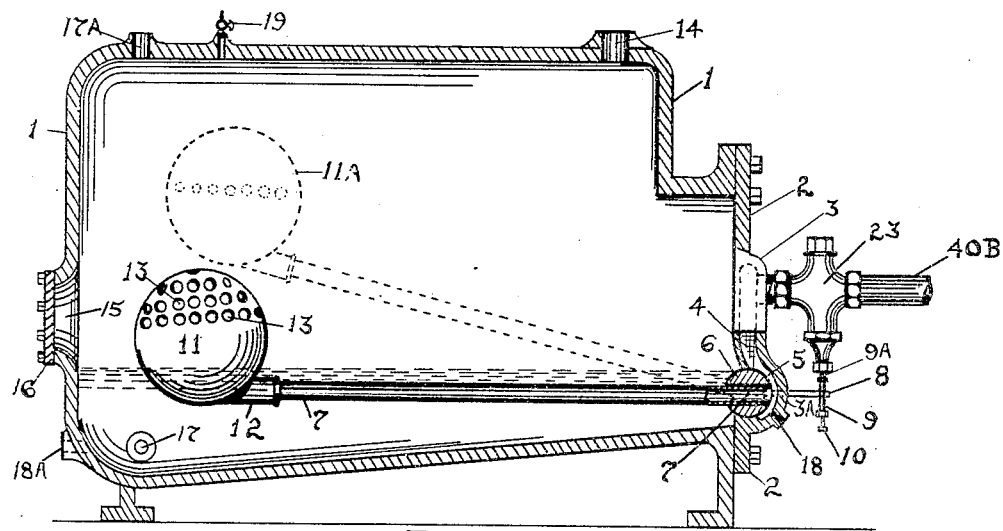
Fig 1
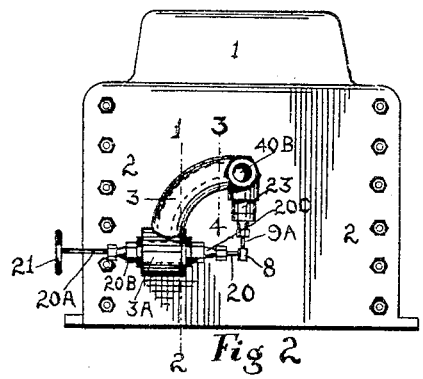
Fig 2
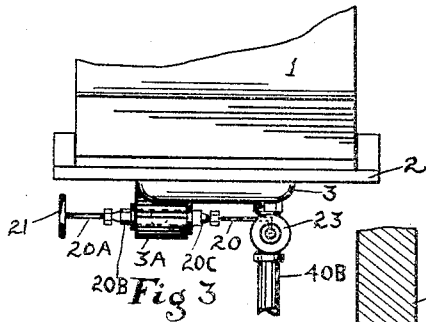
Fig 3
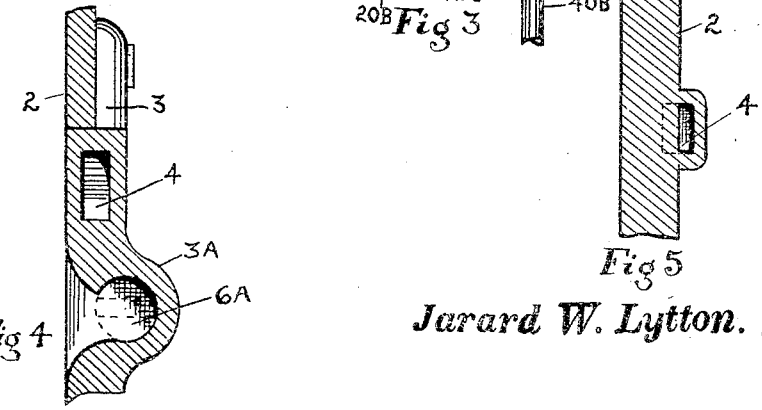
Fig 4
Fig 5
Jarard W. Lytton, Inventor
Witnesses
By Walter B. Burrow, Attorney No. 778,754. PATENTED DEC. 27, 1904.
J. W. LYTTON.
STEAM TRAP.
APPLICATION FILED JULY 29, 1904.

4 SHEETS—SHEET 3.

Jarard W. Lytton. Inventor

No. 778,754. PATENTED DEC. 27, 1904.
J. W. LYTTON.
STEAM TRAP.
APPLICATION FILED JULY 29, 1904.

4 SHEETS—SHEET 4.

Jarard W. Lytton, Inventor

Witnesses

No. 778,754.                                              Patented December 27, 1904.

UNITED STATES PATENT OFFICE.

JARARD W. LYTTON, OF PORTSMOUTH, VIRGINIA.

STEAM-TRAP.

SPECIFICATION forming part of Letters Patent No. 778,754, dated December 27, 1904.

Application filed July 29, 1904. Serial No. 218,753.

*To all whom it may concern:*

Be it known that I, JARARD W. LYTTON, a citizen of the United States, residing at Portsmouth, in the county of Norfolk and State of Virginia, have invented new and useful Improvements in Steam-Traps, of which the following is a specification.

My invention relates to balanced steam-traps and parts thereof; and its objects and advantages will be set forth at length in the following description, while the novelty of which will form the basis of the claims appended thereto.

The said invention includes certain peculiarities, which are shown in simple and convenient embodiments thereof in the drawings forming a part of this specification, in which—

Figure 7:
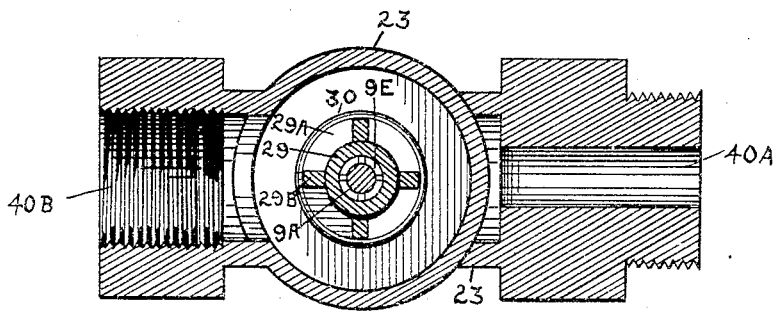
Figure 8:
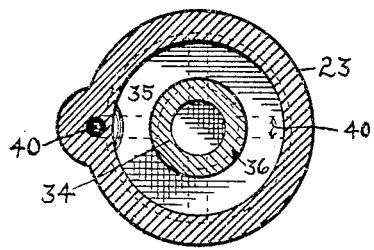
Figure 9:
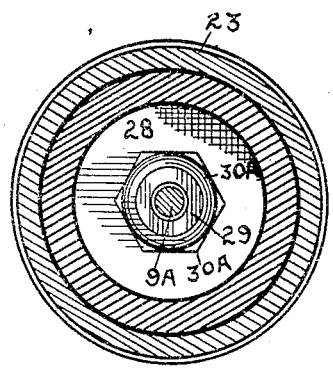
Figure 10:
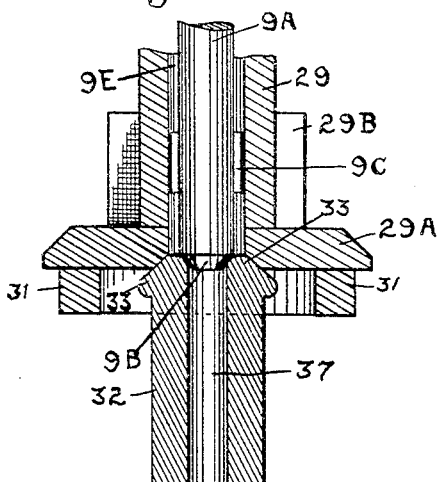
Figure 11:
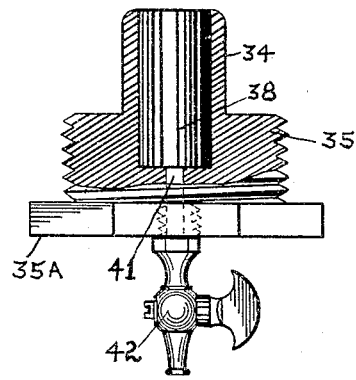
Figure 12:
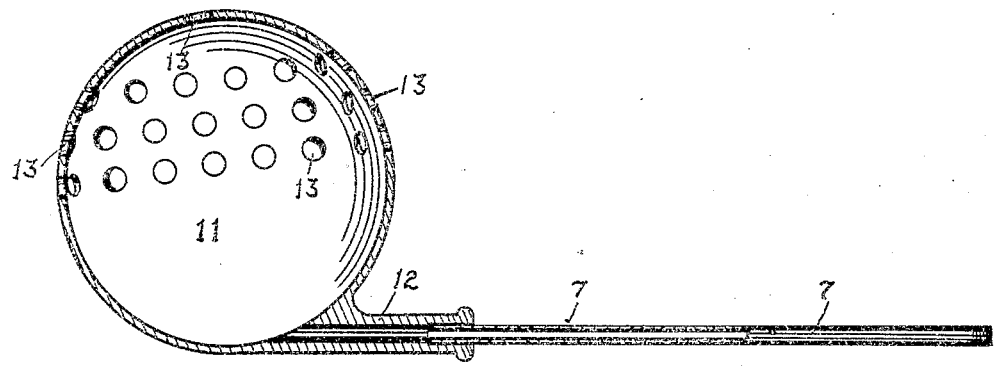
Figure 13:
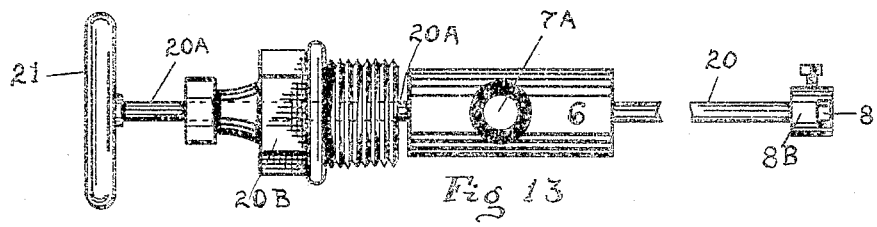
Figure 14:
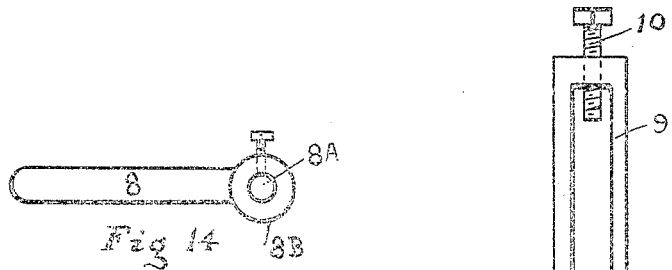
Figure 15:
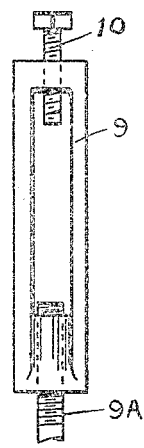
Figure 16:
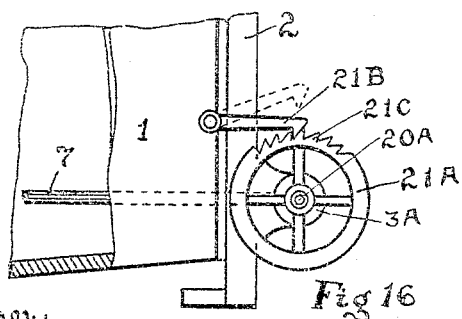

Figure 1 is a sectional elevation of the closed receptacle or chamber forming the trap-body. Fig. 2 is an end elevation of the closed receptacle. Fig. 3 is a part plan of the same. Fig. 4 is a section on the line 1 2 in Fig. 2. Fig. 5 is a section on the line 3 4 in Fig. 2. Fig. 6 is a sectional elevation of the operating-valve. Fig. 7 is a sectional plan on the line 7 8 in Fig. 6. Fig. 8 is a sectional plan on the line 9 10 in Fig. 6. Fig. 9 is a sectional plan on the line 5 6 in Fig. 6. Fig. 10 is an enlarged part-sectional elevation of the piston-operated valve, the auxiliary cylinder-valve, and the valve stem or spindle, as shown in Fig. 6. Fig. 11 is a part-sectional elevation of a plug and drain-cock to be used when the trap is to work against a pressure. Fig. 12 is a sectional elevation of the perforated float and stem. Fig. 13 is a side elevation of the float-plug, hand-wheel, spindle, and the main-valve-operating arm or lever. Fig. 14 is a side elevation of the main-valve-operating lever or arm. Fig. 15 is a front elevation of the yoke or slotted upper end on the main-valve stem or spindle. Fig. 16 is a part side elevation of the closed receptacle or chamber, showing a modification for causing a continuous discharge of the trap.

I desire to state at this point that my invention is in no wise limited to the precise parts nor to their arrangement hereinafter set forth, for I may make such changes as desired within the scope of my claims, and that certain of the terms employed are to be used in their general sense and to embrace equivalents of the elements shown as may be deemed advantageous in constructing my invention.

In the various views of the drawings the same part will be referred to by the same reference numeral or character.

The trap consists of a closed receptacle, chamber, or body 1, preferably of the form shown in Figs. 1 and 2. The receptacle 1 is provided with a dropped or smaller portion, as shown at the right of Fig. 1, and is also provided with suitable flanges, upon which is secured the bonnet or cover 2. The bonnet or cover 2 has a curved projection 3 of any convenient radius to accommodate the curved passage or port 4, which extends partly into the bonnet 2 and partly in the raised portion 3, as shown in Figs. 1, 4, and 5. It may be deemed expedient to have the curved channel-way or port 4 entirely in the bonnet or cover 2 or the projection 3 bolted directly upon it, with suitable apertures for the inlet and outlet, and I am therefore not confined to the exact construction as shown in Figs. 1, 4, and 5.

The channel-way 4 is terminated at one end with a plug casing or sleeve $3^A$ for the perforated plug 6. The plug 6 is secured in the seat or cavity $6^A$, Fig. 4, and therefore it contracts the port or channel 4 at the point 5, as shown in Fig. 1. The plug 6 has an aperture $7^A$, Fig. 13, for one end of the float pipe or stem 7.

8 is an arm or lever provided with an aperture $8^A$ and a hub $8^B$, Fig. 14, and is connected to the plug 6 and extends outside of the closed receptacle or chamber 1 and is for the purpose of raising and lowering the stem or spindle $9^A$ of the valve 23 when the float is actuated.

$9^B$, $9^C$, $9^D$, and $9^E$ are parts of the valve 23 and stem $9^A$, which will be more fully described hereinafter.

10 is an adjusting-screw on the yoke or slotted valve-stem, which will be more fully described hereinafter.

11 is a float having, preferably, the form of a sphere, the dotted lines $11^A$ indicating an angular position of the float.

12 is a sleeve for connecting the pipe 7 to the float and is attached thereto on a tangent, as shown.

13 represents perforations or apertures in the curved surface of the float 11 and are arranged at an angle, as indicated, to enable the perforations to assume a horizontal position when the float is elevated to the point shown by the dotted lines $11^A$. I prefer to place the perforations above the transverse center line of the float, as in Figs. 1 and 12.

14 is an opening for a pipe which serves for the inlet of the trap, through which passes the water or other liquid to be discharged.

15 is a hand hole or opening, and 16 is a plate to enable the interior of the receptacle 1 to be reached without detaching the bonnet 2.

17 and $17^A$ are openings for attachment of a suitable gage-glass or other indicating device.

18 is an opening for a plug or drip-cock for draining the seat or cavity $6^A$, Fig. 4.

$18^A$ is a drain-opening for the rear end of the trap and is placed at or near its lowest position, as shown in Fig. 1.

19 is an air-cock.

20, Figs. 2, 3, and 13, is a stem or spindle connected to the plug 6 at one end and the arm or lever 8 at the other, which engages with the yoke 9 on the main or discharge valve stem $9^A$. The spindle or stem 20 is rendered steam-tight by means of the stuffing-box and plug $20^C$, Figs. 2 and 3.

The action of the float 11 to discharge the water or other fluid at any desired height of the same in the trap, and consequently the period of opening and closing of the main or discharge valve, is adjusted by means of the screw 10 on the spindle-yoke 9 and the thread 22, Fig. 6, on the end of the stem $9^A$, also by moving the arm 8 at any convenient angle on the spindle or stem 20.

$20^A$ is a spindle or stem passing through and rendered steam-tight by the plug and stuffing-box $20^B$, Figs. 2, 3, and 13. One end of the spindle $20^A$ is secured to the plug 6 and the other to a hand-wheel 21 or other device.

The spindles 20 and $20^A$ extend outside of the receptacle 1 and form means for balancing the float 11, which is pivoted on the stems, working steam-tight in the plugs or stuffing-boxes $20^B$ and $20^C$. The object of the spindle $20^A$ and the hand-wheel 21 is to enable the plug 6 and the float 11, as well as the main discharge-valve 23, to be operated exteriorly to the receptacle or chamber 1 in order to discharge it and also to determine the proper working condition of the plug 6 and the other internal working parts within the trap.

$21^A$ is a combined hand and toothed wheel, and $21^B$ is a pawl or dog for engaging the teeth $21^C$ and holding the float 11 at or near the bottom of the receptacle 1, in which position the main or discharge valve 23 is open, causing a continuous discharge as long as the pawl $21^B$ is in engagement with the teeth on the wheel $21^A$.

22, Fig. 6, is a screw-thread on the end of the spindle $9^A$, upon which the yoke or slotted stem end 9 is supported and adjusted.

In Fig. 6, 23 denotes the main-valve casing or body, made of any suitable material, but preferably gun-metal or similar composition.

$9^A$ is the central valve-stem and is provided at its lower end, as shown in Fig. 6, with a tapered or cone portion $9^B$, as will be more fully described hereinafter.

$9^C$ represents guide-lugs for keeping the stem $9^A$ central in the valve-sleeve 29.

$9^D$ is a spring for keeping the spindle $9^A$ normally down upon its seat on the valve 33 and when lifted admits air into the expansion-chamber $26^A$, passing around the spindle $9^A$.

$23^A$ is a packing-nut for compressing the packing 25 in the stuffing-box by means of the gland 24.

26 is the valve-bonnet and is secured to the main body 23, upon which it is screwed and made steam-tight by the clamp ring or nut 27.

28 is a piston working in a cylindrical chamber in the upper portion of the valve casing or body. The piston 28 is provided with suitable packing and is secured to the single puppet or discharge valve $29^A$ by the cylinder or sleeve 29, of which it forms a part, and is secured to the piston by the collar or nut $30^A$. The valve 31 opens downward, its seat 30 being formed with the valve body or casing 23.

$29^B$ represents guide lugs or wings on the valve $29^A$, and its sleeve.

31 is an annular flange on the lower portion of the valve $29^A$.

32 is an auxiliary hollow cylindrical or sleeved valve normally in contact with the valve $29^A$. The valve 32 is opened by the descent of the valve-stem $9^A$, which causes the valve 32 to leave its seat, which allows the pressure-exerting medium to escape into the space $9^E$ between the valve-stem $9^A$ and the sleeve 29 of the valve $29^A$ and into the expansion-chamber $26^A$, which causes the piston 28 to descend and opens the valve $29^A$, and thus discharges the water or other liquid from the trap through the inlet $40^A$ and into the atmosphere or into a tank, well, or receptacle through the outlet $40^B$.

As shown, the spindle or stem $9^A$ is normally seated upon the auxiliary valve 33, which is in turn seated upon the valve $29^A$. Therefore the inner beveled edge of the sleeve 32 becomes the seat of the bevel or cone end of the stem $9^A$, while the outer upper beveled portion of the sleeve forms the contact-point of the valve $29^A$, the contact-surfaces being ground true, so as to be steam and water tight.

The valve-sleeve 32 is provided with suitable packing and is movably secured in the sleeved plug, as at 34, the nut being indicated at $35^A$ and the plug at 35. The plug 35 has an annular groove or channel around its circumference, also passage-ways from the groove 36 to the central cavity 38, in order to provide a connection with the atmosphere, so that water or other fluid from the expansion-chamber 26ᴬ may be expelled in order to allow the piston 28 to assume its normal position and the valve 29ᴬ to resume its seat, as shown in Fig. 6.

When the stem 9ᴬ leaves the valve 33, the expansion-chamber 26ᴬ has a communication with the atmosphere through the channels 9ᴱ, 37, 36, and 40 to the outlet 40ᴮ.

The valve 33 is held to its seat by the spring 39 in the plug-cavity 38 and under the valve-sleeve 32.

In Fig. 11 I show a plug to be used in place of the one at 35 in Fig. 6 when the trap is to discharge against a pressure near that in the trap. The plug shown in Fig. 11 is not provided with grooves, as in Fig. 6 at 36, such being unnecessary.

42 is a drain-cock in the plug shown in Fig. 11, which may be replaced by a pipe as desired.

In Figs. 1, 2, and 3 I show the main discharge-valve 23 inverted, in which position it will operate equally as well as in the position shown in Fig. 6.

I will now describe the working of the trap and its float.

When the float 11 rises to the top of the receptacle or chamber 1, Fig. 1, due to the rise of the liquid within the chamber, the float is stopped in its ascent by the upper inside portion of the receptacle. The liquid then flows through the perforations 13, causing the float to settle to or near the bottom of the chamber. This action brings the arm 8 in contact with the yoke or slotted end 9 on the main discharge-valve stem 9ᴬ, which opens the valve 33, Fig. 6. When the valve 33 is opened, it allows the pressure to enter and fill the expansion-chamber 26, causing the piston 28 to descend and open the valve 29ᴬ. The trap will continue to discharge until the water or other liquid sinks in the receptacle 1 below the level of the perforations 13 and then empties the float 11 by the pipe or stem 7, which discharges into the channel 4 and into the main valve 23. The float being empty will rise, bringing the arm 8 in contact with the screw 10 on the yoke 9, which when lowered, Fig. 1, will put the expansion-chamber 26ᴬ in communication with the atmosphere or discharge, which causes the valve 29ᴬ to be seated.

As already described, the moving parts of my invention are balanced. For example, the bottom of the valve 32 and the stem 9ᴬ being both open to the atmosphere the working pressure on the parts do not act unevenly.

It will be seen that all the more complicated mechanism of the trap is outside, where it can be reached for inspection and repair.

My invention is not limited to the use of steam and water traps; but it may be applied to other uses.

Having described my invention, what I claim, and desire to secure by Letters Patent, is—

1. In a balanced steam-trap and other similar apparatus, the combination with a closed receptacle having inlet and outlet connection, a detachable cover on one end thereof, a segmental-shaped laterally-extending port having a plug-seat at one of its ends and outside of the receptacle, an outlet valve connection on the other end thereof, the said port being partly in and partly projecting outwardly from the said cover and having an approximately semicircular cross-section, and a float-controlled normally closed exteriorly-disposed discharge-valve mechanism forming outlet means for the said port and receptacle; as described.

2. In a balanced steam-trap, the combination with a closed receptacle, having inlet and outlet connection thereto, a detachable bonnet on one end of the said receptacle, an outwardly and laterally curved projection inclosing a correspondingly-curved liquid-discharge passage, a seat at one end of the said passage, a movable cylindrical plug supported in the said seat in the passage, a float-operated water-level-controlled outside-connected discharge-valve for expelling the water or other liquid from the said receptacle.

3. In a balanced steam or liquid expelling trap, the combination with a closed receptacle having inlet and outlet connection, an externally laterally curved projection, the said projection inclosing a correspondingly-curved channel, a cylindrical plug-seat in the said channel, in the said seat, a hollow perforated float, a hollow stem for supporting the float, a spindle-shaft on the said plug, a discharge-valve connected to the said spindle on the plug, means for operating the discharge-valve, float and the plug from the exterior of the receptacle, and ratchet-and-pawl means for holding the said float in a fixed position for causing a continuous or non-automatic discharge of the trap, as described.

4. In a steam-trap, the combination with a closed receptacle having inlet and outlet connection, a bonnet on one end of the said receptacle, a curved discharging-passage, the said passage being curved toward the said outlet, a rotary plug-seat at one end of the said passage, a plug having an aperture and adapted to keep the said passage open to the outlet, a perforated float for rising and falling with the liquid in the trap, a hollow spindle connecting the said float and plug, a supporting-shaft on the said plug, a balanced discharge-valve connected to the discharge end of the said passage, and exterior means for operating the float, plug and the discharge-valve, as described.

5. In a balanced steam-trap, the combination with a closed receptacle or chamber having inlet and outlet connection, the said receptacle having a curved walled projected passage to the said outlet, a movably-supported plug in the said cavity, a stem on the said plug, an angular perforated float, the said perforations extending to or above the transverse axis of the float, a normally closed float-actuated discharge-valve connected to the said curved passage, a lever on one end of the said plug-stem, the said lever adapted to coöperate with the float and operate the discharge-valve, and a wheel or handle on the opposite end of the said plug-stem for hand operation of the float, plug and the discharge-valve from the exterior of the said receptacle or chamber, as described.

6. In a steam-trap and other similar apparatus, the combination with a closed chamber having an inlet and a normally closed outlet, a laterally and outwardly curved discharge-port on the said chamber, a float-controlled plug in the said port, a spherical float having perforations or apertures thereon at an angle, a hollow stem or pipe connected at a tangent on the said float, means for connecting the said float-pipe with the plug, a spindle on the said plug extending outside of the chamber, a normally closed discharge-valve connected exteriorly to the said port, a discharge-valve-operating lever on the said plug-spindle, a wheel or lever on the opposite end of the said plug-spindle for operating the float, plug and discharge-valve from the outside of the receptacle, and means for balancing the mechanism of the trap, as described.

7. In a steam-trap, the combination with a closed receptacle having inlet and outlet connection, a semi-arched projection inclosing a correspondingly-shaped discharge-port, a seat at one end of the said port, a plug movably supported therein, a float having a curved partly-perforated surface, a hollow discharging-stem, means for connecting the said stem with the plug, means for keeping the discharge-float stem or pipe in communication with the said port, an exteriorly-disposed automatic water-level-controlled discharging-valve, a spindle on one end of the said plug having a wheel or lever thereon for hand-operating the said valve and float, an adjustable lever on the other end of the plug-spindle for actuating the said discharge-valve by the movement of the inclosed float, screw-adjustment means for regulating the said lever contact with the valve, and means for operating the discharge-valve independently of the water-level in the said receptacle, as described.

8. In a steam-trap the combination with a closed vessel having inlet and outlet connection, a projecting quadrant inclosing a curved port, an angular perforated float, a hollow float-stem movably supported in the said port and adapted to rise and fall with the liquid-level in the said vessel, means for maintaining a connection with the said float and the port, means for effecting a discharge by the said float from the vessel through the said port to the trap-outlet, and an automatic balanced outside-connected discharge-valve coöperating with the said float, as described.

9. In a steam-trap the combination with a curved ported receptacle, a perforated water-level-actuated float, of a discharge-valve comprising a valve-casing, an expansion-chamber, a fluid-actuated piston having a central aperture movably supported in the said chamber, a main single puppet discharge-valve connected to the said piston by a hollow sleeve, an exteriorly-operated spring-pressed stem passing through the said sleeve, piston and the expansion-chamber, an annular passage between the said stem and sleeve to the expansion-chamber, a spring-pressed bevel-face hollow cylindrical valve beneath the said puppet discharge-valve, means for admitting the atmosphere into the expansion-chamber in contact with the said piston when the valve-stem is operated in one direction, and means for causing pressure to act upon the piston when the said stem is operated in the reverse direction, as described.

10. In a steam-trap, the combination with a reservoir or receptacle having curved outlet-ports therein, a float-controlled valve for discharging the said reservoir comprising a valve-casing, a yoked or slotted spring-pressed tapered end valve-actuating stem, water-level and float regulating means for actuating the steam and valve mechanism, an expansion-chamber in the said valve-casing, a fluid-actuated piston working steam-tight therein, a sleeve surrounding the said stem and forming an annular passage around thereof, a normally closed discharge-valve having a centrally-disposed opening connecting with the said piston and admitting a passage for the pressure-exerting medium to the said expansion-chamber and upon the piston, a bevel or countersunk seat around the aperture in the said discharge-valve, a correspondingly externally and internally tapered and countersunk hollow spring-pressed cylinder-valve normally seated upon the said discharge-valve, a cone-shape or beveled end on the said stem and adapted to normally close the opening in the tapered or countersunk cylindrical valve, and means for causing the said cylinder tapered valve to leave its seat on the discharge-valve by operating the said stem or spindle, as described.

11. In a steam-trap the combination with a closed receptacle having inlet and outlet connection, a perforated liquid-level-controlled float, a balanced discharge-valve comprising a valve-casing, an expansion-chamber, a pressure-actuated piston contained in and normally contracting the said expansion-chamber, a flanged tapered face discharge-valve, the said valve being connected to the said piston by a hollow cylinder, a valve-operating yoked or slotted tapered end valve-stem passing through the said sleeve of the discharge-valve, the piston and the expansion-chamber and to the atmosphere, an internally and externally tapered spring-pressed cylindrical valve normally in contact with the said discharge-valve, a sleeved plug having spring means for supporting the said cylindrical valve, the said plug having a groove or channel around its circumference and channel-ways to the said cylindrical valve, a channel in the valve-casing from the said plug to the atmosphere or valve-outlet, means for causing the atmosphere to enter the expansion-chamber when the valve-stem is operated in one direction, means for unseating the said cylindrical valve when the stem is operated in a reverse direction, and means for operating the said mechanism from the interior and exterior of the trap, as described.

12. In a steam-trap, the combination with a receptacle, a float, a discharging-valve mechanism comprising a valve-casing, an expansion-chamber, a fluid-pressure-actuated piston working therein, a beveled and tapered valve-seat in the said valve-casing, a centrally-perforated internally and externally sleeved discharge-valve normally seated thereon, means for securing the upper end of the said sleeve of the discharge-valve to the piston, a spring-pressed yoked or slotted conical-end valve-stem passing through the said sleeve, piston and the expansion-chamber to the exterior, a passage around the said stem communicating with the expansion-chamber, an externally and internally tapered hollow spring-pressed cylindrical valve normally seated on the discharge-valve and closing the passage around the said stem, means for opening the said passage around the stem and the tapered cylindrical valve by the stem, means for effecting an entrance of the atmosphere by lifting the said stem from the cylindrical valve-face, a grooved plug having a series of channels therein, a cavity and aperture in the said plug, a spring in the said plug-cavity for supporting the said cylindrical valve, a channel-way in the valve-casing to the valve-outlet, means for connecting the said channels in the plug with the valve-casing channel, and plug attachment means for discharging the valve against a pressure when the stem is raised or lowered according to the position of the valve, as described.

In testimony whereof I have hereunto signed my name in the presence of two subscribing witnesses.

JARARD W. LYTTON.

Witnesses:
  CHAS. A. McLEAN,
  J. W. BOOTH.